US011390232B2

(12) United States Patent
Fischer et al.

(10) Patent No.: US 11,390,232 B2
(45) Date of Patent: Jul. 19, 2022

(54) VEHICLE SAFETY SYSTEMS INCLUDING INFLATABLE SEATBELT RESTRAINT

(71) Applicant: ZF Passive Safety Systems US Inc., Washington, MI (US)

(72) Inventors: Kurt F. Fischer, Rochester, MI (US); Alexandra Schroeder, Lenox, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 155 days.

(21) Appl. No.: 16/670,003

(22) Filed: Oct. 31, 2019

(65) Prior Publication Data
US 2021/0129785 A1    May 6, 2021

(51) Int. Cl.
| | |
|---|---|
| *B60R 21/18* | (2006.01) |
| *B60N 2/00* | (2006.01) |
| *B60R 21/233* | (2006.01) |
| *B60R 21/237* | (2006.01) |
| *B60R 21/239* | (2006.01) |
| B60R 21/231 | (2011.01) |
| B60R 21/00 | (2006.01) |

(52) U.S. Cl.
CPC .............. *B60R 21/18* (2013.01); *B60N 2/002* (2013.01); *B60R 21/233* (2013.01); *B60R 21/237* (2013.01); *B60R 21/239* (2013.01); *B60R 2021/0044* (2013.01); *B60R 2021/0053* (2013.01); *B60R 2021/23169* (2013.01)

(58) Field of Classification Search
CPC .......... B60R 21/18; B60R 2021/23169; B60R 2021/0053; B60N 2/002
See application file for complete search history.

(56) References Cited

U.S. PATENT DOCUMENTS

| | | | |
|---|---|---|---|
| 3,414,326 A | 12/1968 | Raffaeli | |
| 3,430,979 A | 3/1969 | Terry et al. | |
| 5,871,230 A * | 2/1999 | Lewis | B60R 21/18 |
| | | | 280/733 |
| 6,293,582 B1 | 9/2001 | Lewis | |
| 6,378,898 B1 * | 4/2002 | Lewis | B60R 21/18 |
| | | | 280/733 |

(Continued)

FOREIGN PATENT DOCUMENTS

| | | | | |
|---|---|---|---|---|
| CN | 112744178 A | * | 5/2021 | ........... B60R 21/237 |
| DE | 102021000984 A1 | * | 4/2021 | ........... B60R 21/207 |

(Continued)

*Primary Examiner* — Karen Beck
(74) *Attorney, Agent, or Firm* — Tarolli, Sundheim, Covell & Tummino LLP

(57) ABSTRACT

An apparatus for helping to protect an occupant of a vehicle includes a tubular inflatable seat belt configured to be moved between an inflated condition and a deflated condition. The inflatable seat belt, when in the inflated condition, is configured to permit the occupant to enter and exit a vehicle seat. The inflatable seat belt, when in the deflated condition, is configured to restrain a seated occupant. An airbag is attached to a lap belt portion of the inflatable seat belt. The airbag is inflatable from a stored condition on the inflatable seat belt to a deployed condition in which the airbag has a lower airbag portion extending from the lap belt portion along the seated occupant's legs and an upper airbag portion extending from the lap belt portion upward in front of the seated occupant's torso.

28 Claims, 8 Drawing Sheets

(56) References Cited

U.S. PATENT DOCUMENTS

| | | | | |
|---|---|---|---|---|
| 7,971,902 B2* | 7/2011 | Azuma | ............... | B60R 21/231 |
| | | | | 280/733 |
| 9,517,744 B2 | 12/2016 | Shimazu | | |
| 9,925,950 B2 | 3/2018 | Moeller et al. | | |
| 10,688,955 B2* | 6/2020 | Shin | ............... | B60R 21/232 |
| 2003/0168837 A1* | 9/2003 | Schneider | ............... | B60R 21/18 |
| | | | | 280/733 |
| 2006/0028004 A1* | 2/2006 | Oota | ............... | B60R 21/231 |
| | | | | 280/733 |
| 2007/0096535 A1* | 5/2007 | Lundell | ............... | B60R 21/01512 |
| | | | | 297/470 |
| 2017/0225788 A1* | 8/2017 | Humbert | ............... | B64D 11/06205 |
| 2021/0094496 A1* | 4/2021 | Tanaka | ............... | B60R 21/231 |
| 2021/0094504 A1* | 4/2021 | Tanaka | ............... | B60R 21/23138 |

FOREIGN PATENT DOCUMENTS

| | | | | |
|---|---|---|---|---|
| KR | 20060025393 A | * | 3/2006 | |
| WO | WO-9313965 A1 | * | 7/1993 | ............. B60R 21/01 |
| WO | 0232726 | | 4/2002 | |
| WO | WO-2020242558 A1 | * | 12/2020 | ........... B60R 21/232 |

* cited by examiner

VEHICLE SAFETY SYSTEMS INCLUDING INFLATABLE SEATBELT RESTRAINT

FIELD OF THE INVENTION

The invention relates to an apparatus for helping to protect an occupant of a vehicle. In one configuration, the invention relates to a tubular inflatable seat belt configured to restrain a seated vehicle occupant. In another configuration, the invention relates to an airbag that is positioned on a seat belt and configured to help protect upright and reclined vehicle occupants. In another configuration, the invention relates an airbag that is positioned on a tubular inflatable seat belt.

BACKGROUND OF THE INVENTION

It is known to provide an inflatable vehicle occupant protection device, such as an airbag, for helping to protect an occupant of a vehicle. Airbags are typically inflatable between a portion of the vehicle and a vehicle occupant. One particular type of airbag is a frontal airbag inflatable between an occupant of a front seat of the vehicle and an instrument panel of the vehicle. Such airbags can be driver airbags or passenger airbags. When inflated, the driver and passenger airbags help protect the occupant from impacts with parts of the vehicle such as the instrument panel and/or a steering wheel of the vehicle. The instrument panel and/or the steering wheel can also act as reaction surfaces against which the frontal airbags are supported to oppose impact forces applied to the frontal airbags by the front seat occupants.

Certain trends in the auto industry are moving toward making vehicle interiors more spacious. These trends occasionally result in reducing the size of the instrument panel. The reduction in size of the instrument panel can result in the space between the instrument panel and front seat occupants being increased. The increase in space can make it more difficult to design an airbag that deploys from the instrument panel toward the vehicle occupant in order to help protect the front seat occupants.

There is also a trend in the auto industry that is leading toward driverless, autonomous, semi-autonomous, automated, and/or semi-automated vehicles. These vehicles may not include an instrument panel and/or a steering wheel. These vehicles also provide front seat occupants the ability to recline the vehicle seat, rotate the vehicle seat, and/or move the vehicle seat forward/rearward in vehicle while the vehicle is in motion. Rotating, reclining, and moving vehicle seats can provide difficulty in protecting the vehicle occupants with certain frontal airbags as these frontal airbags may not be in a position to effectively restrain or protect the occupant if the occupant rotates, reclines, and/or moves.

The current trends in the auto industry can thus provide challenges such as where to place the airbag in a vehicle where the front seat occupants are spaced far from the instrument panel, in a vehicle without an instrument panel, in a vehicle without a steering wheel, in a vehicle having rotatable seats, in a vehicle having reclinable seats, and/or in a vehicle having movable seats. They can also provide the challenge of having to support an airbag without using an instrument panel and/or a steering wheel.

SUMMARY OF THE INVENTION

According to one aspect, an apparatus for helping to protect an occupant of a vehicle includes a tubular inflatable seat belt configured to be moved between an inflated condition and a deflated condition. The inflatable seat belt, when in the inflated condition, is configured to permit the occupant to enter and exit a vehicle seat. The inflatable seat belt, when in the deflated condition, is configured to restrain a seated occupant. An airbag is attached to a lap belt portion of the inflatable seat belt. The airbag is inflatable from a stored condition on the inflatable seat belt to a deployed condition in which the airbag has a lower airbag portion extending from the lap belt portion along the seated occupant's legs and an upper airbag portion extending from the lap belt portion upward in front of the seated occupant's torso.

According to another aspect, alone or in combination with any other aspect, the upper airbag portion can be configured to pivot relative to the lower airbag portion. The airbag can have a biased configuration in which the upper airbag portion, in response to inflation fluid pressure, is biased away from the lower airbag portion toward a seat back of the vehicle seat.

According to another aspect, alone or in combination with any other aspect, the airbag can be configured so that, under the bias of the inflation fluid pressure, the upper airbag portion engages and is biased against the seated occupant's torso regardless of whether the vehicle seat is in an upright or reclined condition.

According to another aspect, alone or in combination with any other aspect, in the biased configuration of the deployed airbag, the upper airbag portion, in response to the inflation fluid pressure, can be urged toward an unobstructed position in which central axes of the upper and lower airbag portions are coextensive. The airbag can be configured so that the upper airbag portion engages the seated occupant's torso and is blocked from reaching the unobstructed position.

According to another aspect, alone or in combination with any other aspect, the seated occupant and/or seat back can limit and/or prevent the upper airbag portion of the deployed airbag from pivoting toward the unobstructed position.

According to another aspect, alone or in combination with any other aspect, the airbag, when in the stored condition, can be rolled and/or folded and stored within a cover attached to the lap belt portion. The cover can be configured to rupture in response to deployment of the airbag.

According to another aspect, alone or in combination with any other aspect, the airbag can be configured so that the lower airbag portion comprises an upper leg airbag portion and a lower leg airbag portion. The lower airbag portion can be configured so that, in the deployed condition, the lower leg airbag portion is curved or bent relative to the upper leg airbag portion. The lower leg airbag portion can be configured to limit and/or prevent a seated occupant's lower legs from hyperextending about the knees.

According to another aspect, alone or in combination with any other aspect, the inflatable seat belt, when in the inflated condition, can extend upward from the vehicle seat to define a space above the vehicle seat that is bounded by the inflatable seat belt that permits the occupant to enter and exit the vehicle seat. The inflatable seat belt, when in the deflated condition, can be configured so that the lap belt portion is positioned on the vehicle occupant's legs to restrain the seated occupant.

According to another aspect, alone or in combination with any other aspect, the apparatus can further include an inflation source configured to direct inflation fluid into the inflatable seat belt to inflate the inflatable seat belt from the deflated condition to the inflated condition. The apparatus can also include a retractor having a spool upon which an end of the inflatable seat belt is connected. Actuation of the inflation source can cause the inflatable seat belt to inflate from the deflated condition to the inflated condition. The inflatable seat belt can be withdrawn from the retractor as the inflatable seat belt inflates. The inflatable seat belt can be configured to retract back onto the retractor as the inflatable seat belt deflates to the deflated condition.

According to another aspect, alone or in combination with any other aspect, as the inflatable seat belt deflates to the deflated condition, the inflatable seat belt can be wound upon the spool of the retractor. Inflation fluid can be pressed out of the inflatable seat belt as the inflatable seat belt is wound upon the spool.

According to another aspect, alone or in combination with any other aspect, the apparatus can further include an inflatable belt controller configured to determine if the vehicle occupant is entering or exiting the vehicle. The inflatable belt controller can be electrically connected to the inflation source. The inflation source can be actuated when the inflatable belt controller determines that the vehicle occupant is entering or exiting the vehicle.

According to another aspect, alone or in combination with any other aspect, the apparatus can further include a control valve operably connected to the inflatable seat belt. The control valve can be actuatable to permit the release of inflation fluid from the inflatable seat belt to responsively cause the inflatable seat belt to deflate to the deflated condition.

According to another aspect, alone or in combination with any other aspect, in the inflated condition of the inflatable seat belt, inflation fluid pressure in the inflatable seat belt can prevent the inflatable seat belt from retracting back onto the retractor. Actuation of the control valve can decrease the inflation fluid pressure in the inflated inflatable seat belt so that the inflatable seat belt is permitted to retract into the retractor.

According to another aspect, alone or in combination with any other aspect, the apparatus can further comprise an inflatable belt controller configured to determine if the vehicle occupant is seated on the vehicle seat. The inflatable belt controller can be electrically connected to the control valve. The control valve can be actuated when the inflatable belt controller determines that the vehicle occupant is seated on the vehicle seat.

According to another aspect, alone or in combination with any other aspect, an apparatus for helping to protect an occupant of a vehicle includes a seat belt for helping to restrain a vehicle occupant seated on a vehicle seat. An airbag is attached to a lap belt portion of the seat belt and is inflatable from a stored condition on the seat belt to a deployed condition in which the airbag has a lower airbag portion extending from the lap belt portion along a seated occupant's legs and an upper airbag portion extending from the lap belt portion upward in front of the seated occupant's torso. The upper airbag portion is configured to pivot relative to the lower airbag portion. The airbag has a biased configuration in which the upper airbag portion, in response to inflation fluid pressure, is biased away from the lower airbag portion toward a seat back of the vehicle seat.

According to another aspect, alone or in combination with any other aspect, the apparatus can further include one or more tethers positioned between the upper and lower airbag portions. The one or more tethers can form a hinge point between the upper and lower airbag portions that assists in pivoting the upper airbag portion.

According to another aspect, alone or in combination with any other aspect, the upper leg airbag portion, the lower leg airbag portion, and the upper airbag portion can be formed together to define a single inflatable volume.

According to another aspect, alone or in combination with any other aspect, the apparatus can further include one or more tethers having a first end connected to the lower leg airbag portion and a second end connected to the upper leg airbag portion. The one or more tethers can form the curve or bend of the lower airbag portion between the upper and lower leg airbag portions.

According to another aspect, alone or in combination with any other aspect, an apparatus for helping to protect an occupant of a vehicle includes a tubular inflatable seat belt configured to be moved between an inflated condition and a deflated condition. The inflatable seat belt, when in the inflated condition, is configured to permit the occupant to enter and exit a vehicle seat. The inflatable seat belt, when in the deflated condition, is configured to restrain a seated occupant. An inflation source is configured to direct inflation fluid into the inflatable seat belt to inflate the inflatable seat belt from the deflated condition to the inflated condition. A retractor has a spool upon which an end of the inflatable seat belt is connected. Actuation of the inflation source causes the inflatable seat belt to inflate from the deflated condition to the inflated condition. The inflatable seat belt is withdrawn from the retractor as the inflatable seat belt inflates. The inflatable seat belt is configured to retract back onto the retractor as the inflatable seat belt deflates to the deflated condition.

According to another aspect, alone or in combination with any other aspect, in the inflated condition of the inflatable seat belt, inflation fluid pressure in the inflatable seat belt can prevent the inflatable seat belt from retracting back onto the retractor.

According to another aspect, alone or in combination with any other aspect, the apparatus can further include an inflatable belt controller configured to determine if the vehicle occupant is seated on the vehicle seat. The inflatable belt controller can be electrically connected to the control valve. The control valve can be actuated when the inflatable belt controller determines that the vehicle occupant is seated on the vehicle seat.

BRIEF DESCRIPTION OF THE DRAWINGS

The foregoing and other features of the invention will become apparent to one skilled in the art to which the invention relates upon consideration of the following description of the invention with reference to the accompanying drawings, in which.

DETAILED DESCRIPTION OF THE INVENTION

Figure 1:
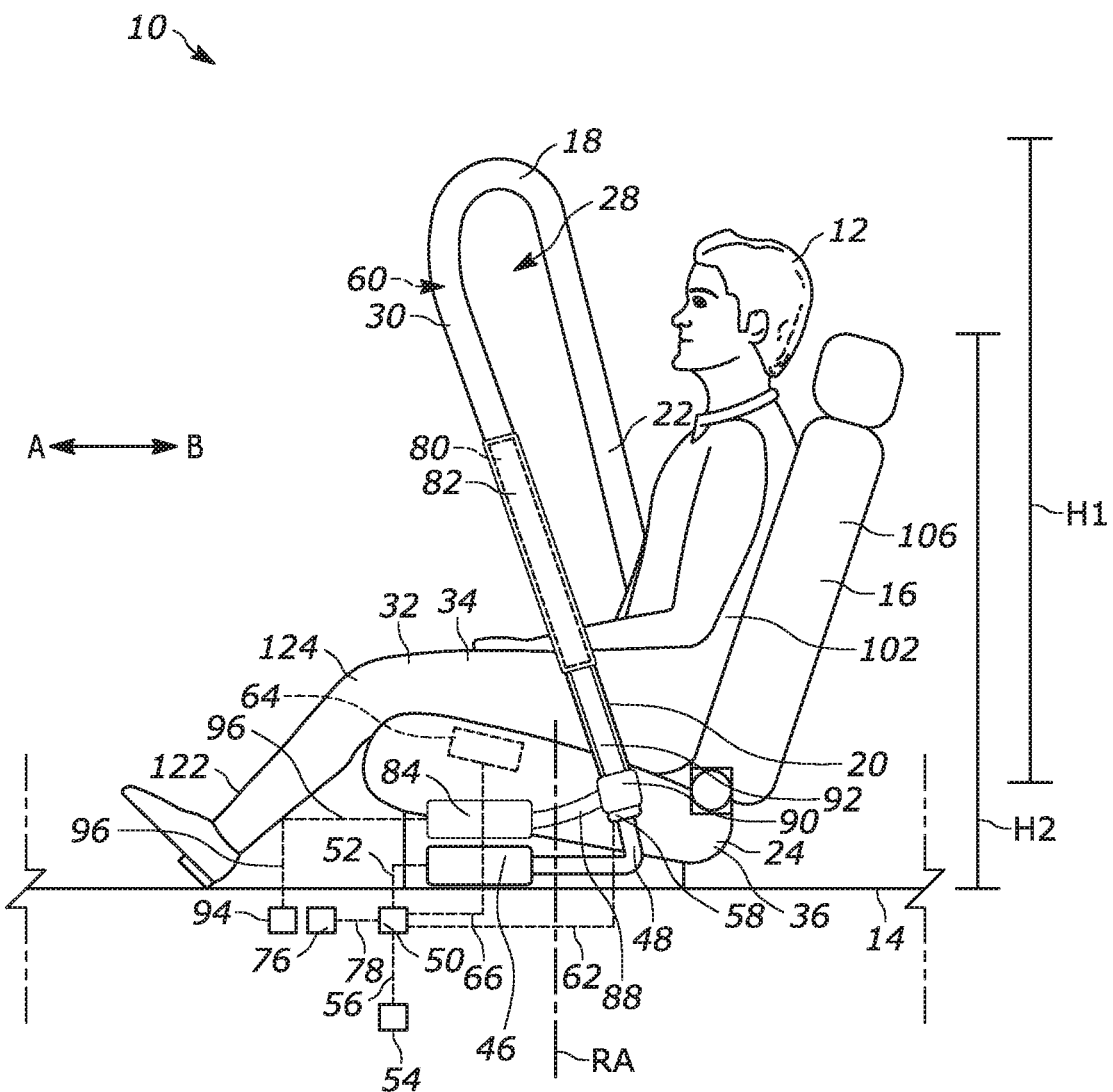
FIG. 1 is a schematic side view illustrating an apparatus for helping to protect an occupant of a vehicle in a first condition.

Vehicle safety systems, such as seat belts and airbags, help restrain and protect vehicle occupants. Certain trends in the auto industry are driving vehicle manufacturers toward reducing the size of instrument panels and/or developing driverless, autonomous, semi-autonomous, automated, and/or semi-automated vehicles that may not include typical airbag support surfaces, such as an instrument panel and/or a steering wheel. These driverless, autonomous, semi-autonomous, automated, and/or semi-automated vehicles can also provide vehicle occupants the freedom to rotate their seats, recline their seats, and/or move their seats forward/rearward in the vehicle while the vehicle is in motion.

Reducing the size of the instrument panel, eliminating the instrument panel, eliminating the steering wheel, providing rotatable vehicle seats, providing reclinable vehicle seats, and providing movable vehicle seats all provide challenges for vehicle safety engineers in designing vehicle safety systems that will help restrain and protect vehicle occupants. An apparatus 10 disclosed herein is designed for helping to restrain and protect an occupant 12 of a vehicle 14 in light of these challenges. The apparatus 10 is intended to overcome these challenges by confining vehicle safety systems, such as a seat belt and/or an airbag, to a vehicle seat 16. Confining the apparatus 10 to the vehicle seat helps eliminate reliance of the apparatus on other vehicle structures, such as an instrument panel or steering wheel, to help protect the vehicle occupant 12.

Additionally, the apparatus 10 advantageously moves with the vehicle seat 16. Thus, if the vehicle seat 16 rotates about a rotational axis RA of a seat base 36 of the vehicle seat, the vehicle safety systems, being confined to the vehicle seat, will rotate with the vehicle seat. If the vehicle seat 16 moves forward, as indicated by an arrow "A" in FIG. 1, or rearward, as indicated by an arrow "B" in FIG. 1, in the vehicle 14, the vehicle safety systems, being confined to the vehicle seat, will move forward/rearward with the vehicle seat. Additionally, because the apparatus 10 moves with the vehicle seat 16, it can be configured to adapt to an upright/reclined condition of the vehicle seat.

Figure 2:
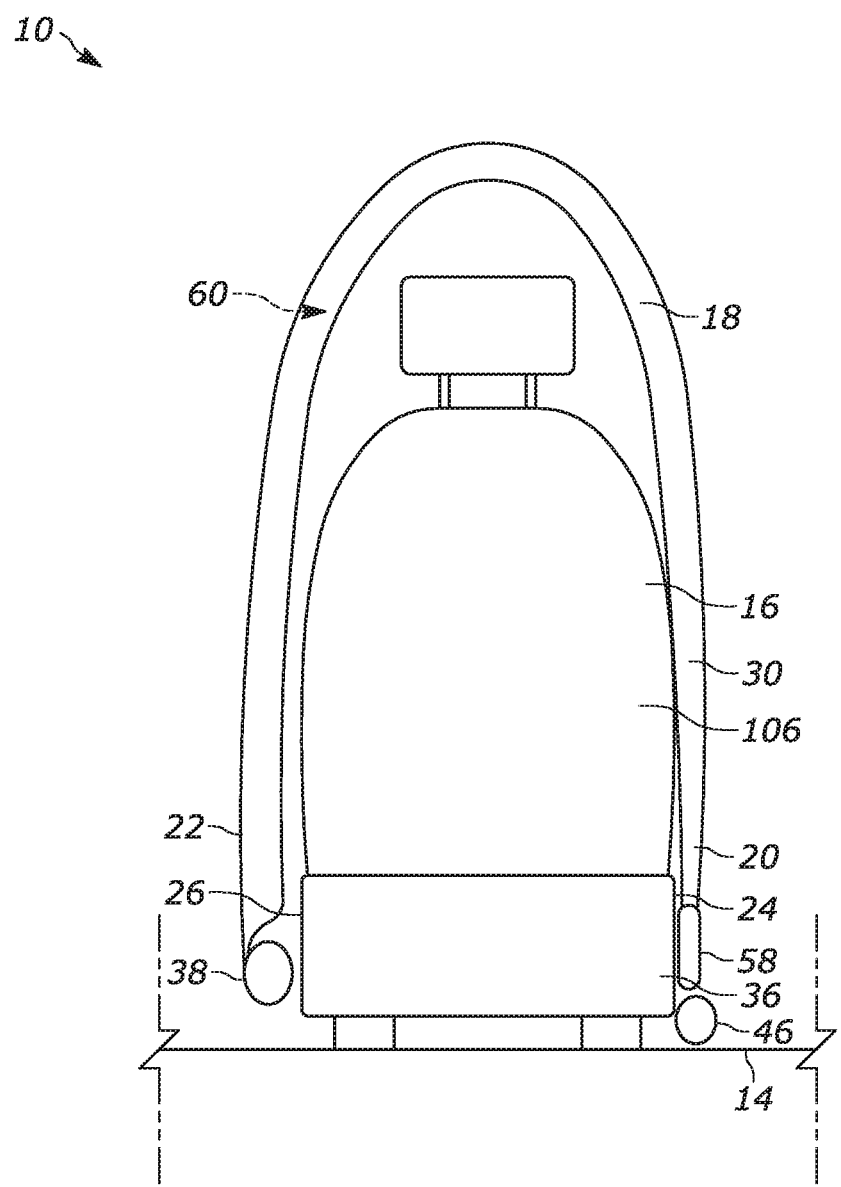
FIG. 2 is a schematic front view illustrating a portion of the apparatus of FIG. 1.
Figure 3:
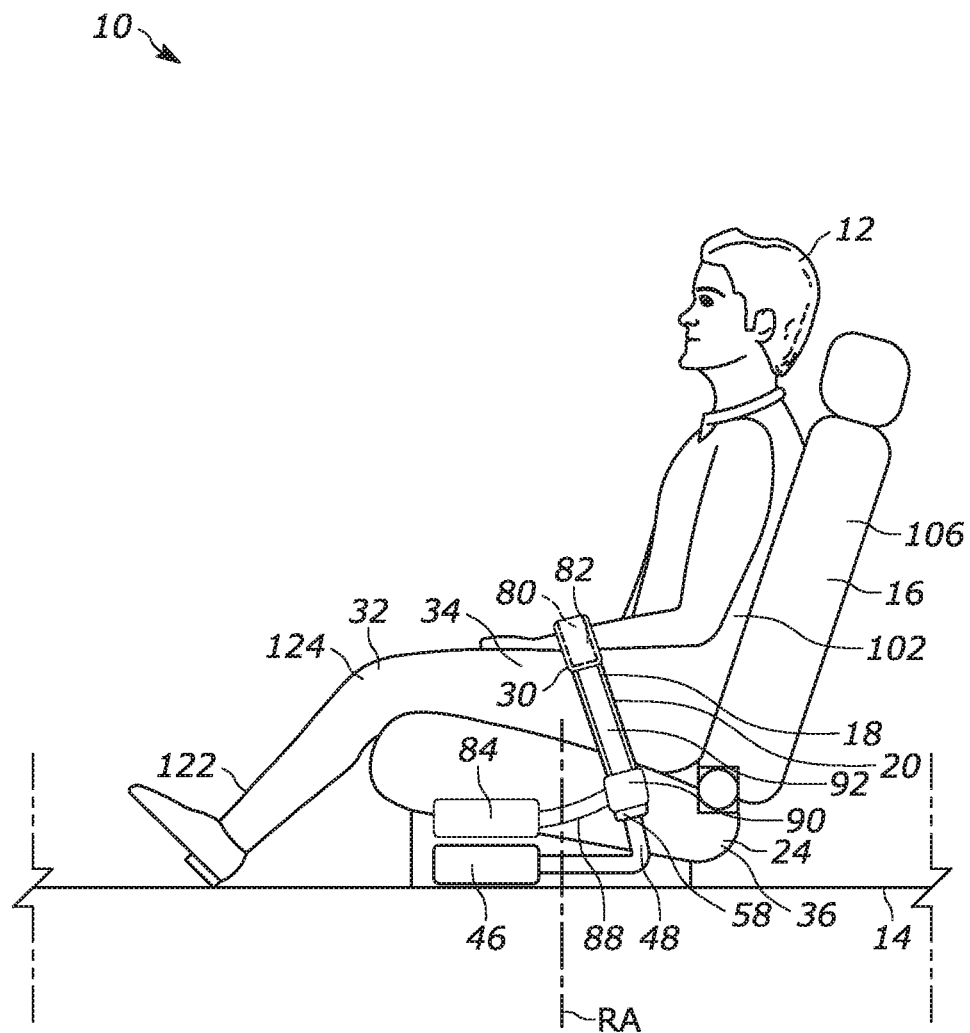
FIG. 3 is a schematic side view illustrating the apparatus of FIG. 1 in a second condition.
Figure 4:
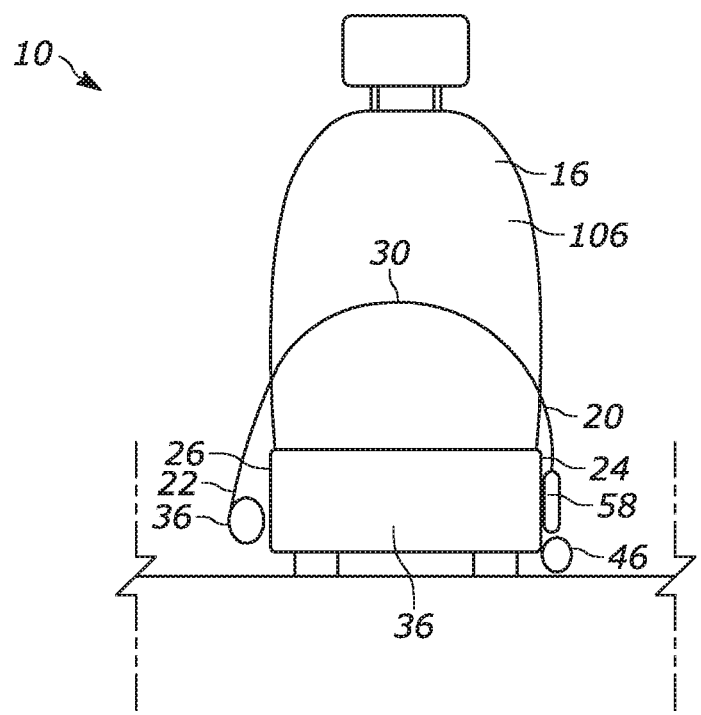
FIG. 4 is a schematic front view illustrating a portion of the apparatus of FIG. 3.

Referring to FIGS. 1-4, the apparatus 10 can include a tubular inflatable seat belt 18 configured to be moved between an inflated and extended condition (FIGS. 1-2) and a deflated and retracted condition (FIGS. 3-4). The inflatable seat belt 18 has opposing first and second belt ends 20, 22. The first belt end 20 has a fixed connection to a first side 24 of the vehicle seat 16. The second belt end 22 is connected to a retractor 38 on a second side 26 of the vehicle seat. The inflatable seat belt 18 is thus confined to the vehicle seat 16. As described above, because of this confinement, the inflatable seat belt 18 moves and rotates with the vehicle seat 16.

The inflatable seat belt 18, when in the inflated and extended condition, is configured to permit the occupant 12 to enter and exit the vehicle seat 16. As shown in FIGS. 1-2, the inflatable seat belt 18, when in the inflated and extended condition, is drawn out from the retractor 38 and extends upward from the vehicle seat 16 to define a space 28 above the vehicle seat that is bounded by the inflatable seat belt. The space 28 permits the occupant 12 to enter and exit the vehicle seat 16 through the space. In the example configuration of FIGS. 1-3, the space 28 has a height H1 that is greater than a height H2 of the vehicle seat 16. The space 28 can be sized so that a large adult, e.g., a $95^{th}$ percentile male, can enter and exit the vehicle seat 16 through the space.

The inflatable seat belt 18, when in the deflated and retracted condition, is configured to restrain a seated occupant 12. As shown in FIG. 3, the inflatable seat belt 18, when in the deflated and retracted condition, is wound onto the retractor 38 so that a lap belt portion 30 of the inflatable seat belt is positioned on the vehicle occupant's legs 32 and/or lap 34 to restrain the seated occupant 12.

The retractor 38 includes a spool 40 upon which the inflatable seat belt 18 is wound. The retractor 38 can be attached to either of the first and second sides 24, 26 of the vehicle seat 16. In the example configuration of FIGS. 1-5, the retractor 38 is attached to the second side 26 of the vehicle seat 16 and the second belt end 22 is connected to the spool 40. The inflatable seat belt 18 is withdrawn from the retractor 38, against the bias of a retractor spring mechanism 42, as the inflatable seat belt inflates to the inflated and extended condition. The inflatable seat belt 18 is responsively urged by the retractor spring mechanism 42 to retract back onto the spool 40 as the inflatable seat belt deflates to the deflated and retracted condition.

Figure 5:
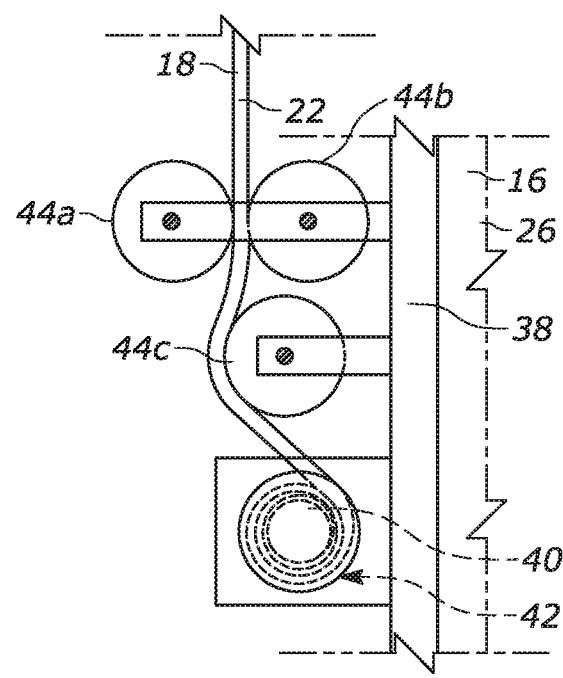
FIG. 5 is a schematic side view illustrating an element of the apparatus of FIG. 1.

As shown in FIG. 5, the retractor 38 can include at least one guiding element 44 that guides the inflatable seat belt 18 as it retracts back onto the spool 40 so that the inflatable seat belt is fed straight back onto the spool and does not shift out of alignment with the spool. In the example configuration of FIG. 5, the at least one guiding element 44 comprises three guiding rollers (shown at 44a, 44b, 44c) that cause the inflatable seat belt 18 to properly retract back onto the spool 40. During use, the inflatable seat belt 18 functions to protect the seated occupant 12 in the same general manner as do conventional seat belts. As such, the retractor 38 can also include locking mechanisms, pretensioners, load limiters, and/or locking sensors similar or identical to those found in conventional seat belts.

To inflate the inflatable seat belt 18 from the deflated and retracted condition to the inflated and extended condition, the apparatus 10 includes an inflation source 46 configured to direct inflation fluid into the inflatable seat belt. The inflation source 46 can be an air compressor, an air pump, a compressed air tank, or any other device that can selectively direct inflation fluid into the inflatable seat belt 18. The inflation source 46 can be attached to the vehicle seat 16 and is operably connected to the first belt end 20 of the inflatable seat belt 18, via an inflation tube 48.

Upon actuation of the inflation source 46, inflation fluid is directed into the inflatable seat belt 18, which causes the inflatable seat belt to inflate and extend. Inflation fluid pressurization of the seat belt 18 produces a force that overcomes the bias of the retractor spring mechanism 42 and unwinds the seat belt from the spool 40. The seat belt thus which deploys to the inflated and extended condition. The inflation fluid pressure in the inflatable seat belt 18 prevents the inflatable seat belt from retracting back onto the retractor 38.

To control the operation of the inflation source 46, the apparatus 10 can include an inflatable belt controller 50 that is operatively connected to the inflation source, e.g., via lead wires 52. The inflatable belt controller 50 is configured to actuate the inflation source 46 to cause the inflation source to inflate the inflatable seat belt 18 from the deflated and retracted condition to the inflated and extended condition. Once the inflatable seat belt 18 inflates to the inflated and extended condition, the inflatable belt controller 50 can cease the operation of the inflation source 46 to discontinue the flow of inflation fluid into the inflatable seat belt.

The inflatable belt controller 50 can be configured to actuate the inflation fluid source 46 upon determining that a vehicle occupant 12 is entering or exiting the vehicle 14 as the inflatable seat belt 18 permits the vehicle occupant to enter and exit the vehicle seat 16 when in the inflated and extended condition. To help the inflatable belt controller 50 in this determination, the apparatus 10 can include an entry/exit sensor 54 electrically connected to the inflatable belt controller, via lead wires 56.

The entry/exit sensor 54 is configured to sense conditions that are used by the inflatable belt controller 50 for determining when an occupant 12 is entering or exiting the vehicle 14. The entry/exit sensor 54 can be a door opening sensor, a door unlock sensor, an engine on/off sensor, an optical sensor, an ultrasonic radar, a motion sensor, and/or any other sensor that can sense conditions useful in determining if an occupant 12 is entering or exiting the vehicle 14. The conditions sensed by the entry/exit sensor 54 are transmitted to the inflatable belt controller 50. Once the inflatable belt controller 50 receives the transmission from the entry/exit sensor 54, the inflatable belt controller determines, based on the sensed conditions, whether a vehicle occupant 12 is entering or exiting the vehicle 14. As an example, when the entry/exit sensor 54 is a door opening sensor, the entry/exit sensor can transmit a signal to the inflatable belt controller 50 indicating when a vehicle door has opened. Once the inflatable belt controller 50 receives the door opened signal, the inflatable belt controller can determine, based on the door opened signal and/or other sensed conditions, that a vehicle occupant 12 is entering or exiting the vehicle 14. The inflatable belt controller 50 actuates the inflation source after the inflatable belt controller determines that an occupant 12 is entering or exiting the vehicle 14 so that the occupant can enter or exit the vehicle seat 16.

The inflatable seat belt 18 is configured to deflate from the inflated and extended condition to the deflated and retracted condition once the occupant 12 has been seated on the vehicle seat 16. The inflatable seat belt 18 can also be configured to deflate to the deflated and retracted condition once the occupant 12 has exited the vehicle 14 so that the inflatable seat belt is positioned in the deflated and retracted condition when no occupant is present within the vehicle. To provide this function, the apparatus 10 can include a control valve 58, such as a solenoid operated valve, that is configured to permit the inflatable seat belt 18 to deflate to the deflated and retracted condition. The control valve 58 can be fluidly connected anywhere along the length of the inflatable seat belt 18. As shown in the example configuration of FIGS. 1-4, the control valve 58 is attached to the first side 24 of the vehicle seat 16 and is operably connected to the first belt end 20.

The control valve 58 is actuatable to permit the release of inflation fluid from the inflatable seat belt 18 to responsively cause the inflatable seat belt to deflate to the deflated and retracted condition. The actuation of the control valve 58 can place an inflatable volume 60 of the inflatable seat belt 18 in fluid communication with surrounding atmosphere so that the inflation fluid in the inflatable seat belt can flow out from the inflatable seat belt. As the inflation fluid flows out from the inflatable seat belt 18, the inflation fluid pressure in the inflatable seat belt decreases. The decrease in inflation fluid pressure permits the inflatable seat belt 18 to retract back onto the spool 40 of the retractor 38. Therefore, the force provided by the inflation fluid pressure in the inflated seat belt 18 that prevented the inflated seat belt from retracting back on the spool 40 is decreased once the control valve 58 is actuated so that the retractor spring mechanism 42 of the retractor 38 can urge withdrawn portions of the inflatable seat belt back onto the spool.

The deflation of the inflatable seat belt 18 is also assisted by the retraction of the inflatable seat belt onto the spool 40. This is because the inflatable seat belt 18 is compressed as it is rewound onto the spool 40. The compression of the inflatable seat belt 18 causes the inflation fluid in the inflatable seat belt to be pressed out of the inflatable seat belt through the control valve 58 as the inflatable seat belt is wound upon the spool 40.

The inflatable belt controller 50 can be electrically connected to the control valve 58, e.g., via lead wires 62, to control the operation of the control valve. The inflatable belt controller 50 can be configured to actuate the control valve 58 open so that the inflatable seat belt 18 can be permitted to deflate. Once the inflatable seat belt 18 deflates to the deflated and retracted condition, the inflatable belt controller 50 can actuate the control valve 58 closed so that the inflatable volume 60 of the inflatable seat belt is no longer in fluid communication with the surrounding atmosphere. The inflatable belt controller 50 can be configured to actuate the control valve 58 open upon determining that a vehicle occupant 12 is seated on the vehicle seat 16 in order to restrain the seated occupant. To help the inflatable belt controller 50 in this determination, the apparatus 10 can include an occupant sensor 64 electrically connected to the inflatable belt controller, via lead wires 66.

The occupant sensor 64 is configured to sense conditions that are used by the inflatable belt controller 50 for determining when an occupant 12 is seated on the vehicle seat 16. The occupant sensor 64 can be a pressure sensor, a weight sensor, an optical sensor, an ultrasonic radar, a motion sensor, and/or any other sensor that can sense conditions useful in determining if an occupant 12 is seated on the vehicle seat 16. The conditions sensed by the occupant sensor 64 are transmitted to the inflatable belt controller 50.

Once the inflatable belt controller 50 receives the transmission from the occupant sensor 64, the inflatable belt controller determines, based on the sensed conditions, whether a vehicle occupant 12 is seated on the vehicle seat 16. For instance, in the example configuration of FIG. 1, the occupant sensor 64 can be a pressure sensor positioned in the seat base 36 of the vehicle seat 16. The pressure sensor 64 transmits a signal to the inflatable belt controller 50 indicating when it detects an increase of pressure.

Once the inflatable belt controller 50 receives the pressure increase signal, the inflatable belt controller can determine, based on the pressure increase signal and/or other sensed conditions, that a vehicle occupant 12 is seated on the vehicle seat 16. The inflatable belt controller 50 actuates the control valve 58 open after the inflatable belt controller determines that an occupant 12 is seated on the vehicle seat 16 so that the occupant can be restrained by the inflatable seat belt 18.

The control valve 58 can have various configurations. For example, the control valve 58 can be a three-way control valve having a first port for connection to the inflation source 46, a second port for connection to the inflatable seat belt 18, and a third port for connection to the surrounding atmosphere. The three-way control valve 58 can have an actuator that is configured to port the inflatable seat belt 18 to the inflation source 46 or to the surrounding atmosphere as determined by the inflatable belt controller 50.

Although the inflatable seat belt 18 has been described as being operable in response to sensed vehicle/occupant conditions, the inflatable seat belt can also be moved between the inflated/extended and deflated/retracted conditions through use of an occupant operated switch 76. As shown in FIG. 1, the switch 76 can be electrically connected to the inflatable belt controller 50, via lead wires 78. When the occupant 12 wants to move the inflatable seat belt 18 to the inflated and extended condition, the occupant can actuate the switch 76 to cause the inflatable belt controller 50 to actuate the inflation source 46. When the occupant 12 wants to move the inflatable seat belt 18 to the deflated and retracted condition, the occupant can actuate the switch 76 to cause the inflatable belt controller 50 to actuate the control valve 58 open. Thus, the inflatable seat belt 18 moving between the inflated/extended and deflated/retracted conditions can be controlled by the vehicle occupant 12 through the switch 76.

In addition to including an inflatable seat belt 18 for restraining a seated occupant 12, the apparatus 10 can also include an airbag 80 that is positioned on the inflatable seat belt and configured help protect the seated occupant from impacts with portions of the vehicle 14 during a collision. The airbag 80 can be constructed of any suitable material, such as nylon (e.g., woven nylon 6-6 yarns), and can be constructed in any suitable manner. For example, the airbag 80 can include one or more pieces or panels of material. If more than one piece or panel is used, the pieces or panels can be interconnected by known means, such as stitching, ultrasonic welding, heat bonding, or adhesives, to form the airbag 80. The airbag 80 can be uncoated, coated with a material, such as a gas impermeable urethane, or laminated with a material, such as a gas impermeable film. The airbag 80 thus can have a gas-tight or substantially gas-tight construction. Those skilled in the art will appreciate that alternative materials, such as polyester yarn, and alternatives coatings, such as silicone, can also be used to construct the airbag 80.

FIGS. 1 and 3 depict the airbag 80 in a stored condition and attached to the lap belt portion 30 of the inflatable seat belt 18. The airbag 80 thus moves with the seat belt 18. The airbag 80, when in the stored condition, is rolled and/or folded and can be placed within a cover 82 that is attached to the lap belt portion 30. The cover 82 holds the airbag 80 rolled and/or folded in the stored condition and is configured to rupture or otherwise open in response to the deployment of the airbag.

As shown in FIG. 3, the stored airbag 80 is positioned so that when the airbag is inflated to a deployed condition, the deployed airbag will be positioned in front of the seated occupant 12 in order to help protect the seated occupant during a collision. Being positioned on the inflatable seat belt 18 helps maintain the position of the airbag 80 relative to the seated occupant 12. Since the inflatable seat belt 18 is confined to the vehicle seat 16 so that the inflatable seat belt rotates and/or moves with the vehicle seat as it rotates about the rotational axis RA and/or moves forward/rearward in the vehicle 14, the airbag 80 maintains its position relative to the occupant 12 as it is also confined to the vehicle seat 16 through its attachment to the inflatable seat belt 18.

Although the airbag 80 is described herein as being attached to the lap belt portion 30 of the inflatable seat belt 18, the airbag 80 can be attached to a lap belt portion of a seat belt that does not inflate. Regardless of being attached to an inflatable or non-inflatable seat belt, the airbag 80 is positioned in front of the seated occupant 12 when the lap belt portion 30 of the inflatable or non-inflatable seat belt is positioned on the occupant's legs 32 and/or lap 34.

Figure 6:
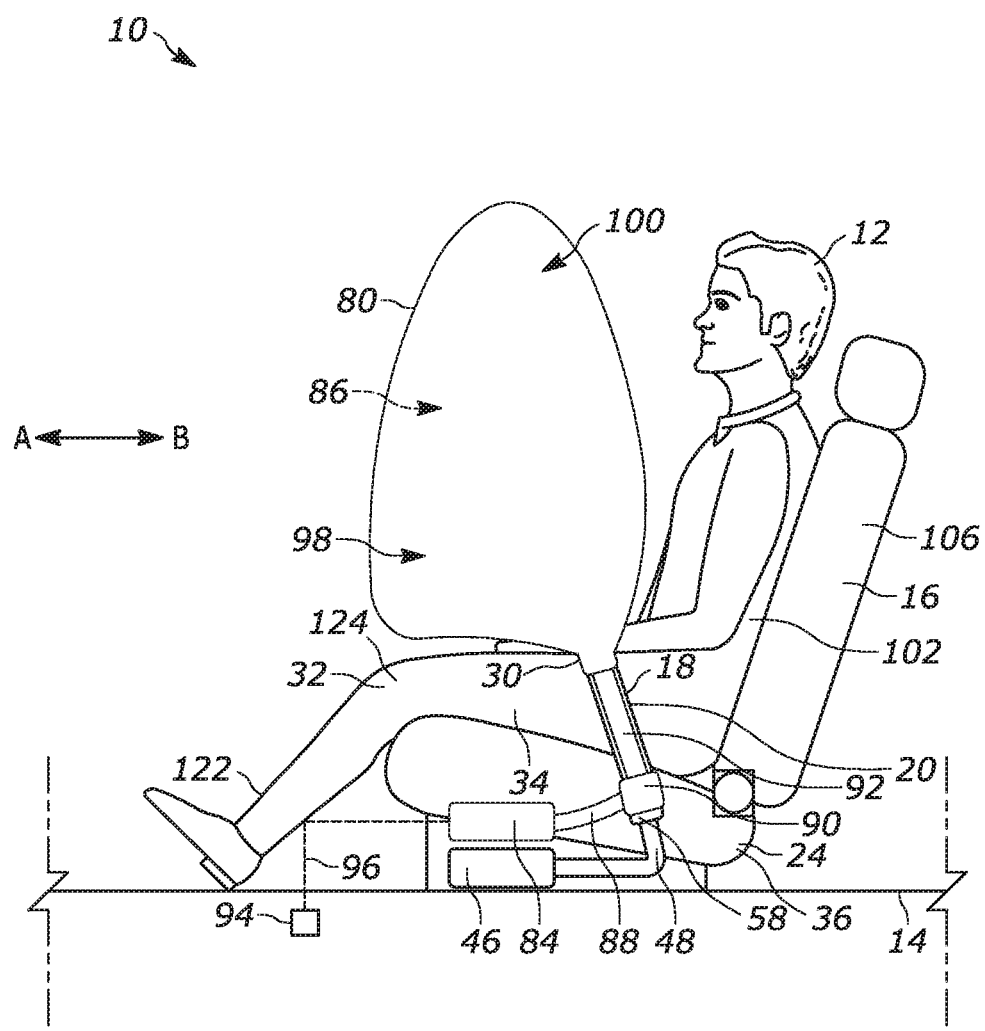
FIG. 6 is a schematic side view illustrating the apparatus of FIG. 1 in a third condition, including a first configuration for a portion of the apparatus.

As shown in FIG. 6, the airbag 80 is inflatable from the stored condition on the inflatable seat belt 18 to the deployed condition. The apparatus 10 includes an inflator 84 that is actuatable to provide inflation fluid to an inflatable volume 86 of the airbag 80 to inflate and deploy the airbag to the deployed condition. The inflator 84 can be of any known type, such as stored gas, solid propellant, augmented, or hybrid. The inflator 84 can be attached to either of the first and second sides 24, 26 of the vehicle seat 16 and can be operably connected to the airbag 80 in any known manner. As shown in the example configuration of FIG. 6, the inflator 84 is attached to the first side 24 of the vehicle seat 16 and is operably connected to the airbag 80, via an inflation tube 88, an inflator adapter 90, and a flexible inflation tube 92. The inflation tube 88 extends between the inflator 84 and the inflator adapter 90. The inflator adapter 90 connects the inflation tube 88 to the flexible inflation tube 92. The flexible inflation tube 92 is connected to the inflatable volume 86 of the airbag 80 so that inflation fluid from the inflator 84 can be directed into the inflatable volume through the flexible inflation tube. An airbag controller 94 can be operatively connected to the inflator 84 via lead wires 96. The airbag controller 94 is configured to actuate the inflator 84 in response to sensing the occurrence of an event for which occupant protection is desired, such as a collision.

In the deployed condition, the airbag 80 has a lower airbag portion 98 that extends from the lap belt portion 30 along the seated occupant's legs 32. The airbag 80 also has an upper airbag portion 100 that extends from the lap belt portion 30 upward in front of the seated occupant's torso 102.

During a collision, the occupant's torso 102 moves or pivots forward about the hips, which are restrained by the lap belt portion 30. The occupant 12 impacts the upper airbag portion 100, and the resulting impact forces are transferred forward and downward to the lower airbag portion 98. Because the lower airbag portion 98 is deployed along the occupant's legs 32, which are supported by the seat base 36, the seat base, through occupant's legs, provides a reaction surface against which the airbag 80 is supported so that the airbag can absorb the impact forces, cushion the occupant 12, and provide a desired ride-down effect.

Advantageously, the apparatus 20 utilizing the occupant's legs 32, supported by the seat base 36, as a reaction surface eliminates the need to rely on other vehicle structures positioned forward of the vehicle seat 16, such as an instrument panel and/or a steering wheel, to perform this function.

Figure 7:
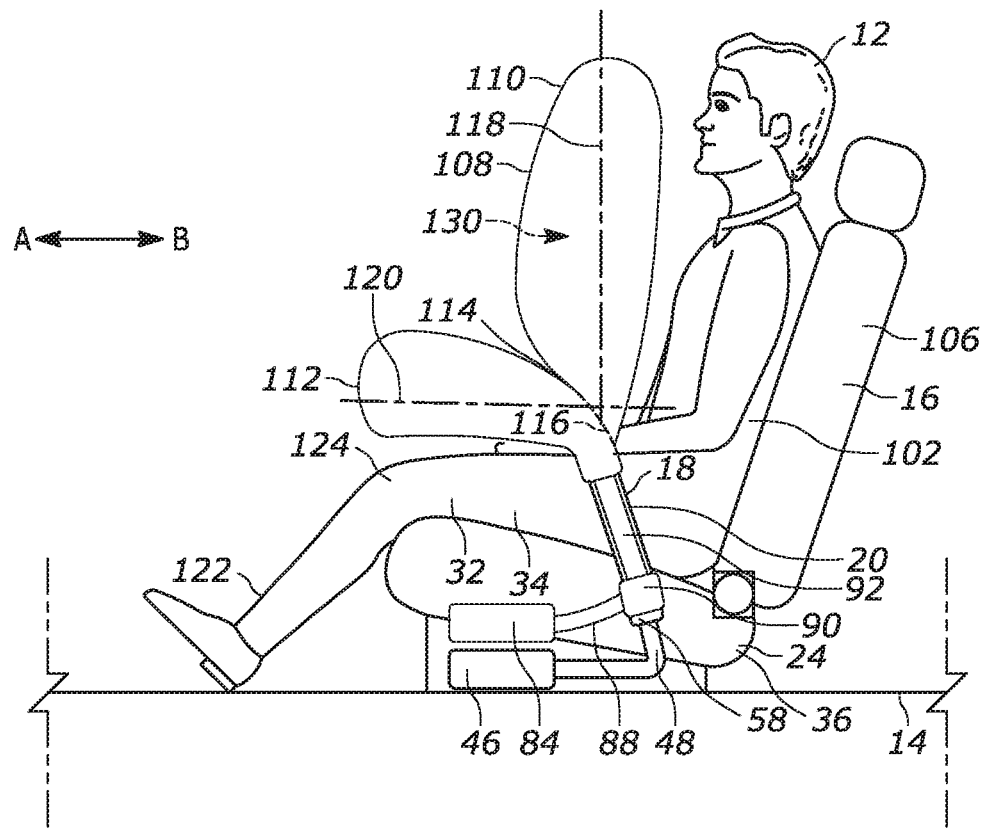
FIG. 7 is a schematic side view illustrating the apparatus of FIG. 1 in the third condition, including a second configuration for a portion of the apparatus.
Figure 8:
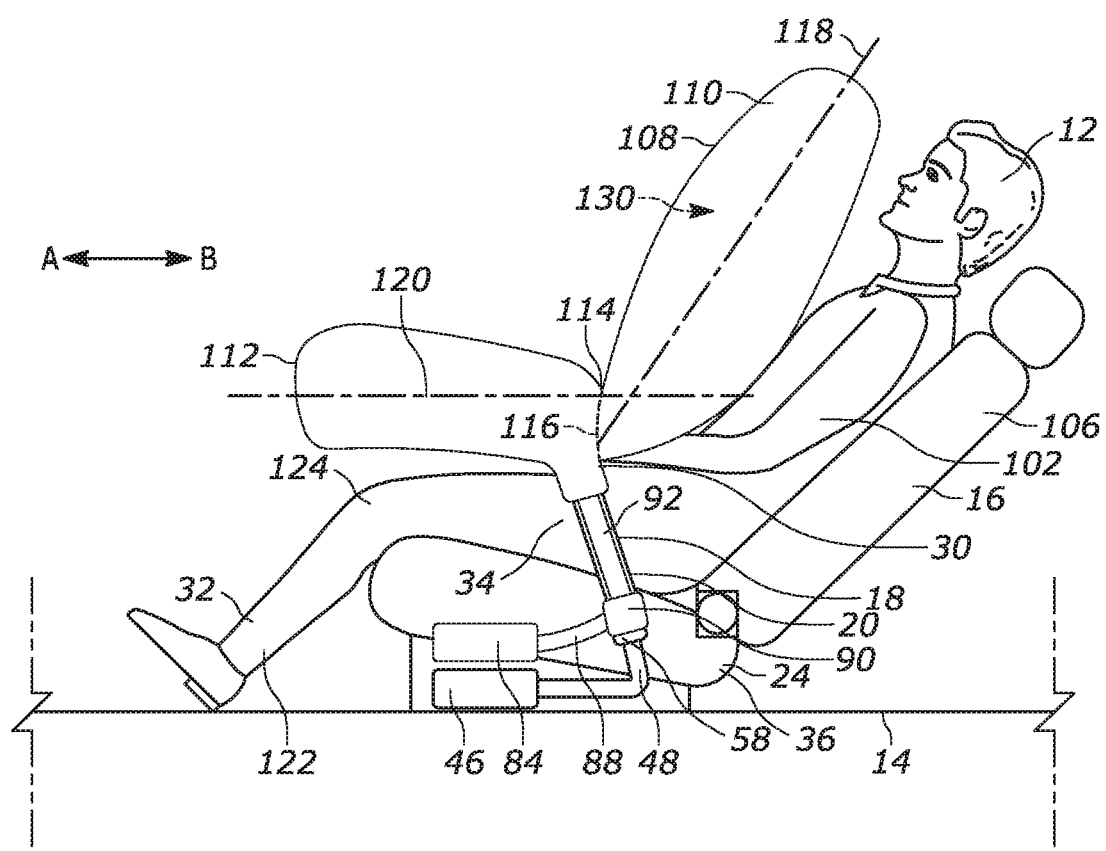
FIG. 8 is a schematic side view illustrating the apparatus of FIG. 7 in a fourth condition.

The vehicle seat 16 can also be configured so that a seat back 106 can recline relative to the seat base 36. This allows the seat back 106 and the occupant 12 to be positioned in an upright condition (FIG. 7), a reclined condition (FIG. 8), or any position between these extremes. To account for the reclined occupant, the airbag 80 can be configured to adapt to the reclined condition of the seat back 106 and the occupant. FIGS. 7-8 depict a configuration of the airbag 80, indicated at 108, that can adapt to the reclined condition of the seat back 106.

As shown in FIGS. 7-8, the upper airbag portion 110 of the airbag 108 is configured to pivot relative to the lower airbag portion 112. A hinge point 114 between the upper and lower airbag portions 110, 112 can assist in pivoting the upper airbag portion. The hinge point 114 can be formed by one or more tethers 116 (internal or external) positioned between the upper and lower airbag portions 110, 112 that restricts the thickness of the overlying airbag panels.

The deployed airbag 108 is configured to have a biased configuration in which the upper airbag portion 110, in response to inflation fluid pressure, is biased away (e.g., pivoted away) from the lower airbag portion 112 toward the seat back 106. Owing to this biased configuration, the upper airbag portion 110, in response to the inflation fluid pressure, is urged to pivot toward an unobstructed position. The unobstructed position of the airbag 108 is the position to which the airbag is configured to deploy when unobstructed by the seated occupant 12 and/or the seat back 106. The airbag 108 is constructed such that if the airbag were to deploy unobstructed by the seated occupant 12 and/or the seat back 106, the airbag 108 would deploy toward a position in which central axes 118, 120 of the upper and lower airbag portions 110, 112 are coextensive.

The deployed airbag 108 is, however, typically blocked from reaching the unobstructed position because the upper airbag portion 110 engages the occupant 12 and/or the seat back 106 prior to reaching the unobstructed position. As shown in FIGS. 7-8, the upper airbag portion 110 engages the occupant 12 as it pivots toward the unobstructed position. This engagement occurs regardless of the reclined position of the occupant 12 and/or the seat back 106. This allows the upper airbag portion 110 to immediately begin cushioning the occupant 12 as the occupant moves the upper airbag portion forward against the inflation fluid bias. Eventually, the upper airbag portion 110 engages the lower airbag portion 112, which is pressed against the occupant's legs 32, supported by the seat base 36, which acts as a reaction surface. The airbag 108 can thus cushion the occupant as described above.

Thus, regardless of whether the vehicle seat 16, and accordingly the seated occupant 12, is positioned in the upright or reclined condition, the upper airbag portion 110 engages and is biased against the seated occupant's torso 102 to help protect the seated occupant. Therefore, the airbag 108 is configured to restrain both upright and reclined seated occupants 12, and is adaptable to the condition of the occupant and/or the seat back 106.

Regardless of the position of the seated occupant 12, the seated occupant's lower legs 122 (i.e., below the knees 124) can pivot upward in response to a collision which can lead to an impact or hyperextension injury. To help limit and/or prevent the seated occupant's lower legs 122 from hyperextending about the knees 124, the lower airbag portion 112 can include a lower leg airbag portion 126 that extends further, i.e., lower, than an upper leg airbag portion 128 of the lower airbag portion.

Figure 9:
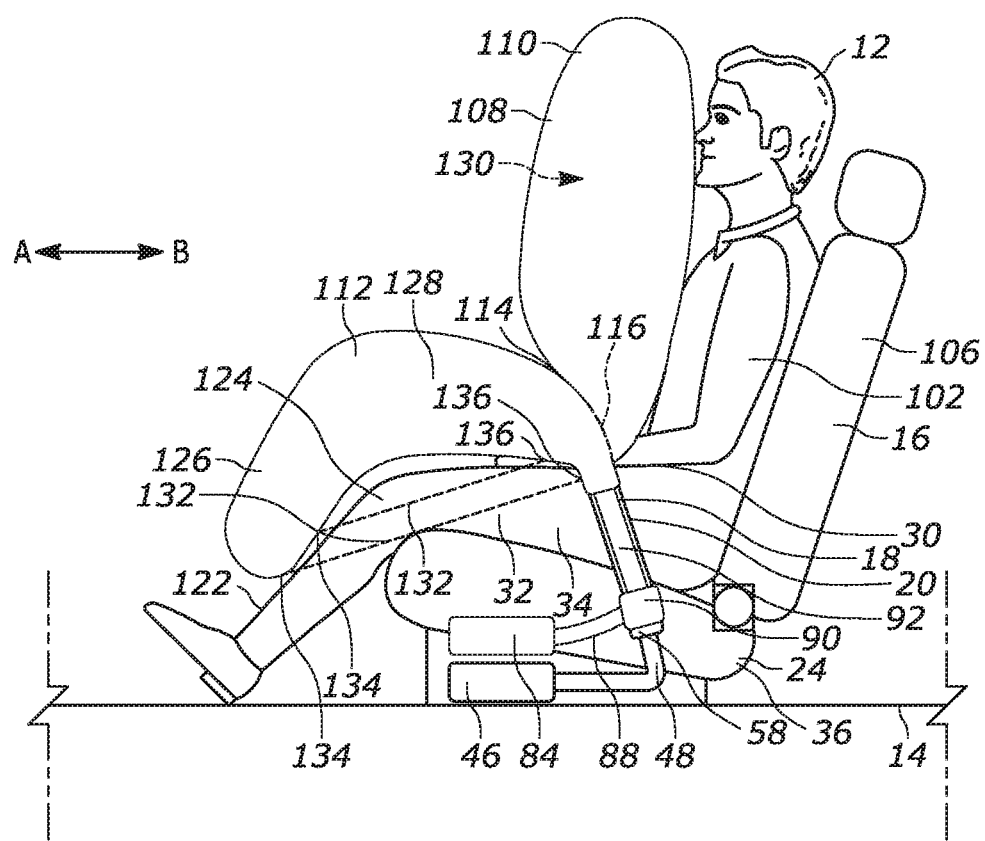
FIG. 9 is a schematic side view illustrating the apparatus of FIG. 1 in the third condition, including a third configuration for a portion of the apparatus.

As a result, as shown in FIG. 9, the lower airbag portion 112 can comprise both the upper leg airbag portion 128 and the lower leg airbag portion 126. The upper leg airbag portion 128, the lower leg airbag portion 126, and the upper airbag portion 110 can be formed together to define a single inflatable volume 130. The lower airbag portion 112 can be configured so that, in the deployed condition, the lower leg airbag portion 126 is curved or bent relative to the upper leg airbag portion 128. The lower airbag portion 112 can thus follow the shape or contour of the occupant's legs 32.

As shown in FIG. 9, one or more tethers 132 (internal or external) can be provided to form the curve or bend of the lower airbag portion 112 between the upper and lower leg airbag portions 128, 126. The tether(s) 132 can have a first end 134 connected to the lower leg airbag portion 126 and a second end 136 connected to the upper leg airbag portion 128 and/or the upper airbag portion 110. In the example configuration of FIG. 9, the second end 136 of the tether(s) 132 is/are connected to the upper leg airbag portion 128.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for helping to protect an occupant of a vehicle, comprising:
   a tubular inflatable seat belt configured to be moved between an inflated condition and a deflated condition, the inflatable seat belt, when in the inflated condition, being configured to permit the occupant to enter and exit a vehicle seat, the inflatable seat belt, when in the deflated condition, being configured to restrain a seated occupant, the inflatable seat belt being configured to be in the inflated condition prior to the occupant entering the vehicle seat; and
   an airbag attached to a lap belt portion of the inflatable seat belt, the airbag being inflatable from a stored condition on the inflatable seat belt to a deployed condition in which the airbag has a lower airbag portion extending from the lap belt portion along the seated occupant's legs and an upper airbag portion extending from the lap belt portion upward in front of the seated occupant's torso.

2. The apparatus of claim 1, wherein the upper airbag portion is configured to pivot relative to the lower airbag portion, and the airbag has a biased configuration in which the upper airbag portion, in response to inflation fluid pressure, is biased away from the lower airbag portion toward a seat back of the vehicle seat.

3. The apparatus of claim 2, wherein the airbag is configured so that, under the bias of the inflation fluid pressure, the upper airbag portion engages and is biased against the seated occupant's torso regardless of whether the vehicle seat is in an upright or reclined condition.

4. The apparatus of claim 2, wherein in the biased configuration of the deployed airbag, the upper airbag portion, in response to the inflation fluid pressure, is urged toward an unobstructed position in which central axes of the upper and lower airbag portions are coextensive, and wherein the airbag is configured so that the upper airbag portion engages the seated occupant's torso and is blocked from reaching the unobstructed position.

5. The apparatus of claim 4, wherein the seated occupant and/or seat back limits and/or prevents the upper airbag portion of the deployed airbag from pivoting toward the unobstructed position.

6. The apparatus of claim 1, wherein the airbag, when in the stored condition, is rolled and/or folded and stored within a cover attached to the lap belt portion, the cover being configured to rupture in response to deployment of the airbag.

7. The apparatus of claim 1, wherein the airbag is configured so that the lower airbag portion comprises an upper leg airbag portion and a lower leg airbag portion, the lower airbag portion being configured so that, in the deployed condition, the lower leg airbag portion is curved or bent relative to the upper leg airbag portion, the lower leg airbag portion being configured to limit and/or prevent a seated occupant's lower legs from hyperextending about the knees.

8. The apparatus of claim 1, wherein the inflatable seat belt, when in the inflated condition, extends upward from the vehicle seat to define a space above the vehicle seat that is bounded by the inflatable seat belt that permits the occupant to enter and exit the vehicle seat, and wherein the inflatable seat belt, when in the deflated condition, is configured so that the lap belt portion is positioned on the vehicle occupant's legs to restrain the seated occupant.

9. The apparatus of claim 1, further comprising:
an inflation source configured to direct inflation fluid into the inflatable seat belt to inflate the inflatable seat belt from the deflated condition to the inflated condition; and
a retractor having a spool upon which an end of the inflatable seat belt is connected;
wherein actuation of the inflation source causes the inflatable seat belt to inflate from the deflated condition to the inflated condition, the inflatable seat belt being withdrawn from the retractor as the inflatable seat belt inflates; and
wherein the inflatable seat belt is configured to retract back onto the retractor as the inflatable seat belt deflates to the deflated condition.

10. The apparatus of claim 9, wherein as the inflatable seat belt deflates to the deflated condition, the inflatable seat belt is wound upon the spool of the retractor, inflation fluid being pressed out of the inflatable seat belt as the inflatable seat belt is wound upon the spool.

11. The apparatus of claim 9, further comprising an inflatable belt controller configured to determine if the vehicle occupant is entering or exiting the vehicle, the inflatable belt controller being electrically connected to the inflation source, the inflation source being actuated when the inflatable belt controller determines that the vehicle occupant is entering or exiting the vehicle.

12. The apparatus of claim 9, further comprising a control valve operably connected to the inflatable seat belt, the control valve being actuatable to permit the release of inflation fluid from the inflatable seat belt to responsively cause the inflatable seat belt to deflate to the deflated condition.

13. The apparatus of claim 12, wherein in the inflated condition of the inflatable seat belt, inflation fluid pressure in the inflatable seat belt prevents the inflatable seat belt from retracting back onto the retractor, and wherein actuation of the control valve decreases the inflation fluid pressure in the inflated inflatable seat belt so that the inflatable seat belt is permitted to retract into the retractor.

14. The apparatus of claim 12, further comprising an inflatable belt controller configured to determine if the vehicle occupant is seated on the vehicle seat, the inflatable belt controller being electrically connected to the control valve, the control valve being actuated when the inflatable belt controller determines that the vehicle occupant is seated on the vehicle seat.

15. The apparatus of claim 2, further comprising one or more tethers positioned between the upper and lower airbag portions, the one or more tethers forming a hinge point between the upper and lower airbag portions that assists in pivoting the upper airbag portion.

16. The apparatus of claim 7, wherein the upper leg airbag portion, the lower leg airbag portion, and the upper airbag portion are formed together to define a single inflatable volume.

17. The apparatus of claim 7, further comprising one or more tethers having a first end connected to the lower leg airbag portion and a second end connected to the upper leg airbag portion, the one or more tethers forming the curve or bend of the lower airbag portion between the upper and lower leg airbag portions.

18. An apparatus for restraining an occupant of a vehicle, comprising:
a tubular inflatable seat belt configured to be moved between an inflated condition and a deflated condition, the inflatable seat belt, when in the inflated condition, being configured to permit the occupant to enter and exit a vehicle seat, the inflatable seat belt, when in the deflated condition, being configured to restrain a seated occupant, the inflatable seat belt being configured to be in the inflated condition prior to the occupant entering the vehicle seat;
an inflation source configured to direct inflation fluid into the inflatable seat belt to inflate the inflatable seat belt from the deflated condition to the inflated condition; and
a retractor having a spool upon which an end of the inflatable seat belt is connected;
wherein actuation of the inflation source causes the inflatable seat belt to inflate from the deflated condition to the inflated condition, the inflatable seat belt being withdrawn from the retractor as the inflatable seat belt inflates; and
wherein the inflatable seat belt is configured to retract back onto the retractor as the inflatable seat belt deflates to the deflated condition.

19. The apparatus of claim 18, wherein in the inflated condition of the inflatable seat belt, inflation fluid pressure in the inflatable seat belt prevents the inflatable seat belt from retracting back onto the retractor.

20. The apparatus of claim 18, wherein as the inflatable seat belt deflates to the deflated condition, the inflatable seat belt is wound upon the spool of the retractor, inflation fluid being pressed out of the inflatable seat belt as the inflatable seat belt is wound upon the spool.

21. The apparatus of claim 18, wherein the inflatable seat belt, when in the inflated condition, extends upward from the vehicle seat to define a space above the vehicle seat that is bounded by the inflatable seat belt that permits the occupant to enter and exit the vehicle seat, and wherein the inflatable seat belt, when in the deflated condition, is configured so that a lap belt portion of the inflatable seat belt is positioned on the vehicle occupant's legs to restrain the seated occupant.

22. The apparatus of claim 18, further comprising an inflatable belt controller configured to determine if the vehicle occupant is entering or exiting the vehicle, the inflatable belt controller being electrically connected to the inflation source, the inflation source being actuated when the inflatable belt controller determines that the vehicle occupant is entering or exiting the vehicle.

23. The apparatus of claim 18, further comprising a control valve operably connected to the inflatable seat belt, the control valve being actuatable to permit the release of inflation fluid from the inflatable seat belt to responsively cause the inflatable seat belt to deflate to the deflated condition.

24. The apparatus of claim 23, wherein in the inflated condition of the inflatable seat belt, inflation fluid pressure in the inflatable seat belt prevents the inflatable seat belt from retracting back onto the retractor, and wherein actuation of the control valve decreases the inflation fluid pressure in the inflated inflatable seat belt so that the inflatable seat belt is permitted to retract back onto the retractor.

25. The apparatus of claim 23, further comprising an inflatable belt controller configured to determine if the vehicle occupant is seated on the vehicle seat, the inflatable belt controller being electrically connected to the control valve, the control valve being actuated when the inflatable belt controller determines that the vehicle occupant is seated on the vehicle seat.

26. The apparatus of claim 1, wherein the inflatable seat belt has opposing first and second belt ends, the first belt end being fixedly connected on a first side of the vehicle seat in the inflated and deflated conditions, the second belt end being fixedly connected to a retractor on a second side of the vehicle seat in the inflated and deflated conditions.

27. The apparatus of claim 1, wherein the inflatable seat belt is configured to be deflated from the inflated condition to the deflated condition to engage and restrain the seated occupant, the inflatable seat belt being configured to be inflated from the deflated condition to the inflated condition to disengage the seated occupant and permit the seated occupant to exit the vehicle seat.

28. The apparatus of claim 18, wherein the inflatable seat belt is configured to be deflated from the inflated condition to the deflated condition to engage and restrain the seated occupant, the inflatable seat belt being configured to be inflated from the deflated condition to the inflated condition to disengage the seated occupant and permit the seated occupant to exit the vehicle seat.

\* \* \* \* \*